July 17, 1923.

B. F. SEYMOUR 1,462,386

COMBINED RESILIENT BEARING AND TRANSMISSION

Filed Dec. 3, 1919 2 Sheets-Sheet 1

Inventor:
B. F. Seymour,

Att'y.

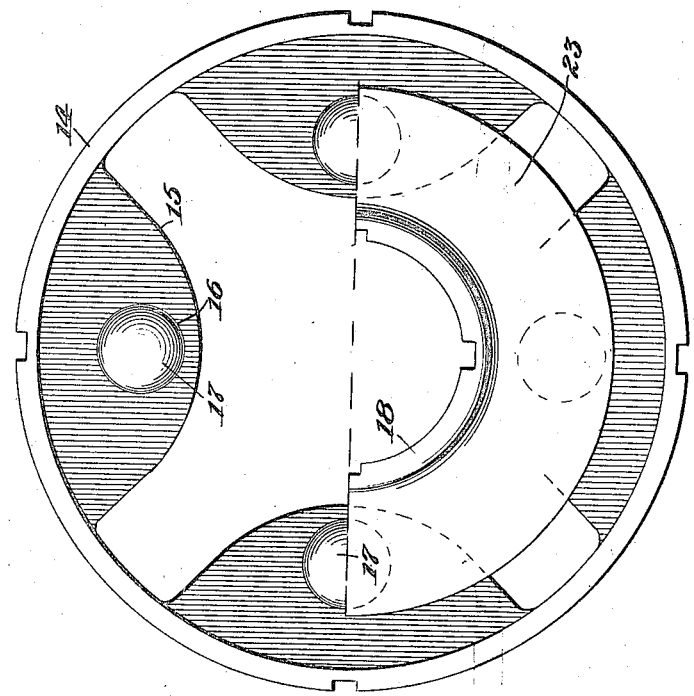
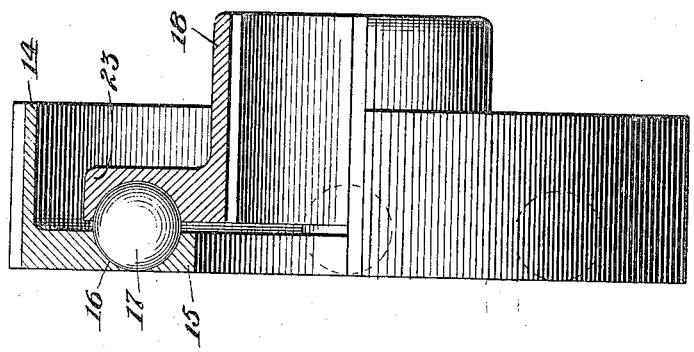

Patented July 17, 1923.

1,462,386

UNITED STATES PATENT OFFICE.

BENJAMIN F. SEYMOUR, OF WASHINGTON, DISTRICT OF COLUMBIA.

COMBINED RESILIENT BEARING AND TRANSMISSION.

Application filed December 3, 1919. Serial No. 342,286.

*To all whom it may concern:*

Be it known that I, BENJAMIN F. SEYMOUR, a citizen of the United States, residing at Washington, in the District of Columbia, have invented certain new and useful Improvements in Combined Resilient Bearings and Transmissions; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction shown herein is proposed as an improvement or other embodiment of the types of combined resilient transmission and bearing disclosed in my co-pending applications for United States patents bearing the Serial Nos. 302,415, 302,416, 310,970, 322,627, 342,284, 342,285, filed June 7, 1919; June 7, 1919; July 15, 1919; Sept. 9, 1919; Dec. 3, 1919; Dec. 3, 1919.

The arrangement shown herein is further characterized in that uniformly distributed and co-operable cone elements are provided for the driving and driven element to said flanges have each one face bearing against the inner side plates 6 of the hub portion the end of obtaining equal and uniformly distributed pressure under all working conditions, whereby to obtain maximum efficiency and ease of operation.

Figure 2:
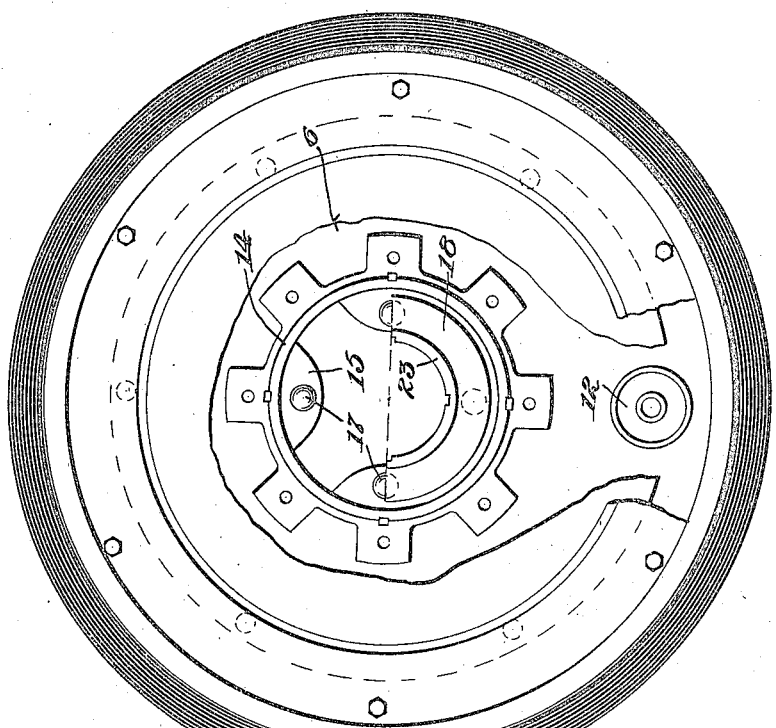
Figure 1:
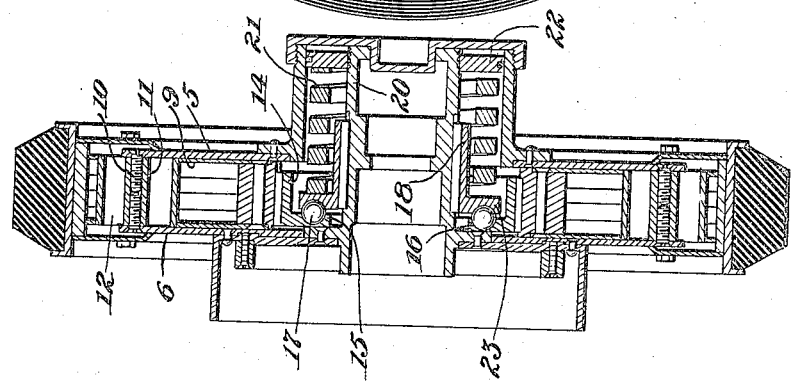

The invention is shown by way of illustration in the accompanying drawings wherein, Figure 1 is a central sectional view showing the application of the device to a vehicle wheel, Figure 2, a side elevational view thereof, Figure 3, an enlarged detail view, partly in section of the transmitting and bearing elements per se, and Figure 4 is a similar view thereof taken at right angles to Figure 3.

Referring to the construction in further detail and wherein like reference characters designate corresponding parts, the construction consists of a hub portion formed of two side plates, or housing members, 5 and 6 which are disposed against the inner rim portion 9 of the wheel, as shown. The two hub members 5 and 6 are secured to the wheel rim by the series of pairs of bolts 10 screwed into threaded sleeves 11 that serve as spacing elements and which are located within the spaces, or chambers, 12, as indicated in Figures 1 and 2. It will be understood, of course, that said spaces 12 are provided to allow the wheel rim to have limited radial movement with respect to the axis 13 of the wheel.

The resilient transmission and bearing device per se consists of an inner rim portion 14 having a plurality of centrally disposed flanges 15 formed respectively with semi-spherical-shaped apertures 16 adapted to receive and hold therein the several balls 17 as shown (see Figs. 2 and 3).

A collar 18 is splined on the hub part 20 and is adapted to have limited axial movement thereon against the tension of a spring 21 whose respective ends bear against a collar 22 adjustable on the hub 20 and a flange 23 formed integral with the slidable collar 18.

The flange 23 is formed on one face with a plurality of semi-spherical apertures adapted to receive the complementary services of the several balls 17 and thereby, and through the action of the spring 21, the several elements 15, 17, and 23 are held in co-operative relation, and to permit of limited relative movement in a radial or angular direction between the hub proper and the wheel rim.

It will therefore be seen from the foregoing that any motion or shock of the shaft or axle will transmit a like movement to the wheel hub through the medium of the co-acting cones, and that such transmission will be flexible or resilient in nature. And it will be further seen that any jarring motion imparted to the wheel will be resiliently taken up by the co-operating cone elements together with the spring.

The invention is not to be understood as being limited to the details of construction herein shown and described, as these may be varied widely without departing from the spirit of the invention.

Having thus described my invention what I claim as new is:—

1. In a combined resilient transmission and bearing for vehicle wheels, the combination of a hub portion having side plates, a wheel rim mounted to have limited radial movement between said side plates, said rim provided with a plurality of centrally disposed flanges disposed in bearing relation against one of said side plates; a collar axially movable on the hub, complemental recesses formed in said flanges and the collar, anti-friction bearings fitting in said recesses, and tensioning means associated with said collar and the rim, substantially as set forth.

2. In a combined resilient transmission and bearing for vehicle wheels, the combination of, a hub portion, a wheel rim mounted to have limited radial movement therein, said rim provided with a plurality of centrally disposed flanges a collar splined on the hub, a plurality of opposed semi-spherical recesses formed in said collar and said flanges, a plurality of balls fitting in said recesses and forming supporting elements between said radially movable rim and the collar, a spring tensioning said splined collar, and means for regulating the tension of said spring, substantially as set forth.

3. In a combined resilient transmission and bearing for vehicle wheels, the combination of, a hub portion having side plates, a wheel rim mounted to have limited radial movement between the side plates, said rim having a plurality of centrally disposed flanges each bearing on one side against one of the side plates; a collar splined on the hub, said collar and flanges having a plurality of opposed semi-spherical recesses, balls fitting in said recesses and forming supporting elements between said radially movable rim and the splined collar, and tensioning means engaging the collar, substantially as set forth.

In testimony whereof I affix my signature.

BENJAMIN F. SEYMOUR.